(12) United States Patent
Matoba et al.

(10) Patent No.: US 6,317,940 B1
(45) Date of Patent: Nov. 20, 2001

(54) SYNTHETIC RESIN SWIVEL HOOK

(75) Inventors: Hiroshi Matoba; Ryoichiro Uehara, both of Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/559,948

(22) Filed: Apr. 27, 2000

(30) Foreign Application Priority Data

May 11, 1999 (JP) .................................................. 11-130397
Mar. 8, 2000 (JP) .................................................. 12-063763

(51) Int. Cl.[7] ............................. F16B 45/02; A44B 13/00
(52) U.S. Cl. ......................................... 24/600.9; 24/601.2
(58) Field of Search .............................. 24/600.9, 601.2, 24/265 H, 598.7, 318; 294/82.19, 82.2

(56) References Cited

U.S. PATENT DOCUMENTS

| 4,577,374 | * | 3/1986 | Lii | 24/165 |
| 4,665,592 | * | 5/1987 | Kasai | 24/601.2 |
| 4,868,954 | * | 9/1989 | Kasai | 24/601.2 |
| 4,908,913 | * | 3/1990 | Mori | 24/599.4 |
| 5,274,887 | * | 1/1994 | Fudaki | 24/600.9 X |
| 5,566,428 | * | 10/1996 | Takahashi | 24/265 H |
| 5,671,514 | * | 9/1997 | Matoba et al. | 24/601.2 |

* cited by examiner

*Primary Examiner*—Robert J. Sandy
(74) *Attorney, Agent, or Firm*—Finnegan, Henderson, Farabow, Garrett & Dunner, L.L.P.

(57) ABSTRACT

A synthetic resin swivel hook having a hook body and a stopper piece, wherein the stopper piece comprises a base end portion protruded from the base portion; a curved portion formed to be integral with the base end portion and forming substantially C-shape or U-shape protruding toward an inner face of the hook body and being open outward between the base end portion and the hook body; and a tongue piece portion extending from the curved portion up to an inside fitting face at an end of the hook body. The base end portion acts as a protective wall when the curved portion is elastically deformed. Using the above described structure of the curved portion and contraction thereof at the time of molding, from the first, the tongue piece portion is disposed inside of a front end inside fitting face of the hook body upon molding.

9 Claims, 6 Drawing Sheets

SYNTHETIC RESIN SWIVEL HOOK

BACKGROUND OF THE INVENTION

1. Field of the Invention

The present invention relates to a synthetic resin swivel hook for use in various kinds of bags, knapsack and the like.

2. Description of the Related Art

Recently, instead of a metallic swivel hook, synthetic resin swivel hook has been more often used because the synthetic resin swivel hook is composed of a smaller number of parts than the metallic swivel hook and the synthetic resin swivel hook ensures a better productivity and it is light and cheap. On the contrary, the metallic swivel hook requires a larger number of parts, so that its assembly process is composed of more steps thereby leading to a higher price. Further, because the metallic swivel hook is difficult to paint with durable colors, it lacks of fashion performance so that it is not suitable for traveling bag, shoulder bag or the like. Thus, use of the metallic swivel hook is limited to particular sectors, for example, expensive goods.

An example of the synthetic resin swivel hook has been disclosed in, for example, Japanese Patent Laid-Open Publication No. 9-32839. This synthetic resin swivel hook comprises a hook body protruded from a base portion and a stopper piece which is protruded from the same base portion toward a tip end of the hook body and elastically deformed around a base end thereof. The hook body or stopper piece has a projection projecting from its inner face toward the stopper piece or the hook body provided near the base end and a height of a front end of the projection is set so that it comes into contact with the inner face of the stopper piece or inner face of the hook body within an elastic limit of the base end when the stopper piece is deformed.

In the swivel hook disclosed in this publication, because the hook body and/or the stopper piece has the projection having a desired height directed toward a counterpart on the inner face of the base end portion thereof, even if a strong outside force is applied to the base end portion of the stopper piece, deformation exceeding an elastic limit of the stopper piece is prevented by the aforementioned projection, so that a breaking of the base end portion of the stopper piece, which is the part easiest to be broken is prevented securely. Further, because an existence of the projection prevents a ring, which is attached to an end of a belt and engages the hook body, from moving to between the base ends of the hook body and stopper piece, even if an outside force is applied outward of the hook body by the ring, the ring is moved from the base end of the stopper piece to a front end thereof by the projection, thereby preventing the base end of the stopper piece from being damaged.

However, in the swivel hook disclosed in the above publication, because of the existence of the projection projecting from the inner face of the hook body or the stopper piece, after the same projection comes into contact with the opposing inner face of the stopper piece or hook body, a base end of rotation, when the stopper piece is elastically deformed in the direction to an inner face of the hook body, is moved from a projection end on the base portion to an edge of the projection on the side toward a front end of the hook body, an amount of rotation is reduced extremely. Thus, if it is intended to form an opening space sufficient for engaging the ring attached to the belt to the hook body, the depth and height of the hook body need to be larger than conventionally. As a result, there is produced an adverse effect that the swivel hook itself is enlarged. If an outside force exceeding the aforementioned elastic limit is applied to the stopper piece near the front end of the hook body with respect to the projection, the stopper piece may be broken at the edge of the projection on the side of the front end of the hook body.

As disclosed by U.S. Pat. No. 5,146,657 for example, the conventional synthetic resin swivel hook is formed with the stopper piece slightly off a front end outer surface of the hook body and after the formation, the stopper piece is elastically deformed to fit onto an inside fitting face at a front end of the hook body. Thus, a working amount for it cannot be neglected so that it affects production cost to some extent.

SUMMARY OF THE INVENTION

Accordingly, the present invention has been achieved to solve the above described problems and therefore, an object of the invention is to provide a synthetic resin swivel hook in which a length and depth of a hook body can be set like conventionally, a stopper piece is more easily deformed elastically than conventionally so that there is no fear that the stopper piece may be broken even if a strong outside force is applied thereto and the stopper piece can be formed such that it is in contact with an inner face of the hook body without any special process.

The above object is achieved effectively by the present invention.

According to the present invention, there is provided a synthetic resin swivel hook having a hook body extending from a base portion and a stopper piece extending up to a curved end portion of the hook body from the base portion and elastically deformable at a base end thereof, wherein the stopper piece comprises a base end portion protruded from the base portion; a curved portion formed to be integral with the base end portion and forming substantially C-shape or U-shape protruding toward an inner face of the hook body and being open outward between the base end portion and the hook body; and a tongue piece portion extending from the curved portion up to an inside fitting face of the curved end portion of the hook body.

The base end portion of the stopper piece is not related directly to elastic deformation and so structured that even if a strong outside force is applied, its base end does not get broken. On the other hand, the hook body and belt connecting ring are not different from the conventional though their design, structure and operational effect are different from the conventional.

If an ordinary outside force is applied to the tongue piece portion of the stopper piece, most of the force is consumed for elastic deformation of its curved portion, so that a front end of the tongue piece portion comes into contact with an inner face of the hook body smoothly. If the aforementioned outside force is released, the curved portion is restored to its original shape. With the restoration action, the tongue piece portion returns to its original position so that it comes into contact with the inside fitting face at the curved end portion of the hook body. If a strong outside force is applied to the base end portion of the stopper piece, the base end portion is never elastically deformed and further may not be broken because stiffness and strength thereof are higher than the other portions. Further, the stopper piece has a blocking function for the curved portion, thereby preventing the curved portion and the tongue piece portion from being broken.

The aforementioned structure of the stopper piece of the present invention is effective for manufacturing of the swivel hooks with a high efficiency. Generally, a molded product is contracted when it is taken out from a cavity in a molding die at the time of molding. Particularly in the C-shaped or U-shaped molded product, because a temperature distribution of the molded product is different at the time of molding, the product is contracted such that both opening side ends approach each other. According to the present invention, if the curved portion is constructed as described above, after molding, the curved portion is deformed in a direction that both the open ends approach each other because of contraction, although the cavity is designed such that an end of the tongue piece portion is slightly off a front end fitting face of the hook body. As a result, the end of the tongue piece portion comes into contact with the inside fitting face of the front end of the hook body or approaches it with a gap to an extent not deteriorating the function of the swivel hook.

Conventionally, the swivel hook is molded with a front end of the stopper piece located outside of the curved end portion of the hook body, and after the molding, the stopper piece is elastically deformed so that the front end elastically engages with the front end fitting face on an inner face of the hook body. According to the present invention, it is possible to eliminate a process in which by deforming elastically the stopper piece, a front end thereof is made to fit to the front end fitting face provided on an inner face of the hook body, thereby leading to improvement of productivity and reduction of production cost.

There may be a case that the aforementioned contraction of the tongue piece portion is little so that there is a gap between the end of the tongue piece portion and the fitting face of the hook body, which is too big to maintain the function of the swivel hook. Therefore, preferably, a projection is provided on the inside fitting face of the hook body, the projection projecting toward the tongue piece portion.

In the mold, if a cavity for molding the projection is formed to communicate with a cavity for molding the inside fitting face of the hook body, a projecting end of the projection scarcely contacts with the end of the tongue piece portion, so that the function of the swivel hook may be lost. Therefore, preferably, a thin portion at the projecting end of the projection is formed to be integral with a front end outer face of the tongue piece portion by means of molding.

In other words, the cavity for molding the projection in the mold is formed to communicate with the cavity for molding the inside fitting face of the hook body and the cavity for molding the end of the tongue piece portion. In this case, a channel between the cavity for molding the projection and the cavity for molding the end of the tongue piece portion is formed to be quite narrow. With this arrangement, the end of the projection and the end of the tongue piece portion is connected by a thin connection when the molding is completed, and the end of the tongue piece portion is positioned to be closer to the end of the projection at the time of molding. Because the connection is thin, it can be easily broken at the time of first usage after molding, and also, the end of the tongue piece portion contacts with the end of the projection stably or there is a gap which is small enough to maintain the function of the swivel hook.

Also preferably, a connecting piece is provided to connect an area in the curved portion of the stopper piece which is nearest to the inner face of the hook body, with an inner face area of the hook body confronting the aforementioned area integrally.

The curved portion of the stopper piece is liable to be deformed so as to be away from the inner face of the hook body due to the contraction in molding. Therefore, when a strong outside force is exerted on the stopper piece, it may get broken at a portion connecting with the base portion. When the area, nearest to the inner face of the hook body, of the stopper piece and the confronting inner face area of the hook body is connected by the small connecting piece, the deformation to move the stopper piece away from the inner face of the hook body due to the contraction in molding can be prevented. Further, even if a strong outside force is exerted on the stopper piece, the tongue piece portion which is easily deformed deforms elastically at the connecting piece so that any troubles such as breakage can be prevented.

According to the present invention, the base end portion and curved portion, particularly the shape of the curved portion is specified. Preferably, the curved portion is curved toward an inner face of the hook body from halfway of the base end portion and protruded toward an inner face of the hook body. Alternatively, the curved portion is curved continuously from a tip end of the base end portion toward an inner face of the hook body and protruded toward an inner face of the hook body. Also alternatively, the curved portion is curved continuously from the tip end of the base end portion toward the base portion so as to protrude toward an inner face of the hook body.

According to the invention, the shape of the tongue piece portion is specified. That Is, the tongue piece portion is composed of a narrow plate member extending linearly or in a curved shape up to the inside fitting face of the hook body from an end of the curved portion.

DESCRIPTION OF THE PREFERRED EMBODIMENTS

Hereinafter, the present invention will be described based on the preferred embodiments shown in the accompanying drawings in detail. In a swivel hook 1 shown in the illustrated example, a belt connecting ring for connecting a belt or the like to a swivel hook main body and the swivel hook main body are connected such that they are rotatable around a center line in the length direction with respect to each other, as disclosed in U.S. Pat. No. 5,566,428. However, it is permissible to mold the belt connecting ring and the swivel hook main body separately and assemble them after the molding of each, as disclosed in, for example, EP No. 0099577 A1.

Figure 1:
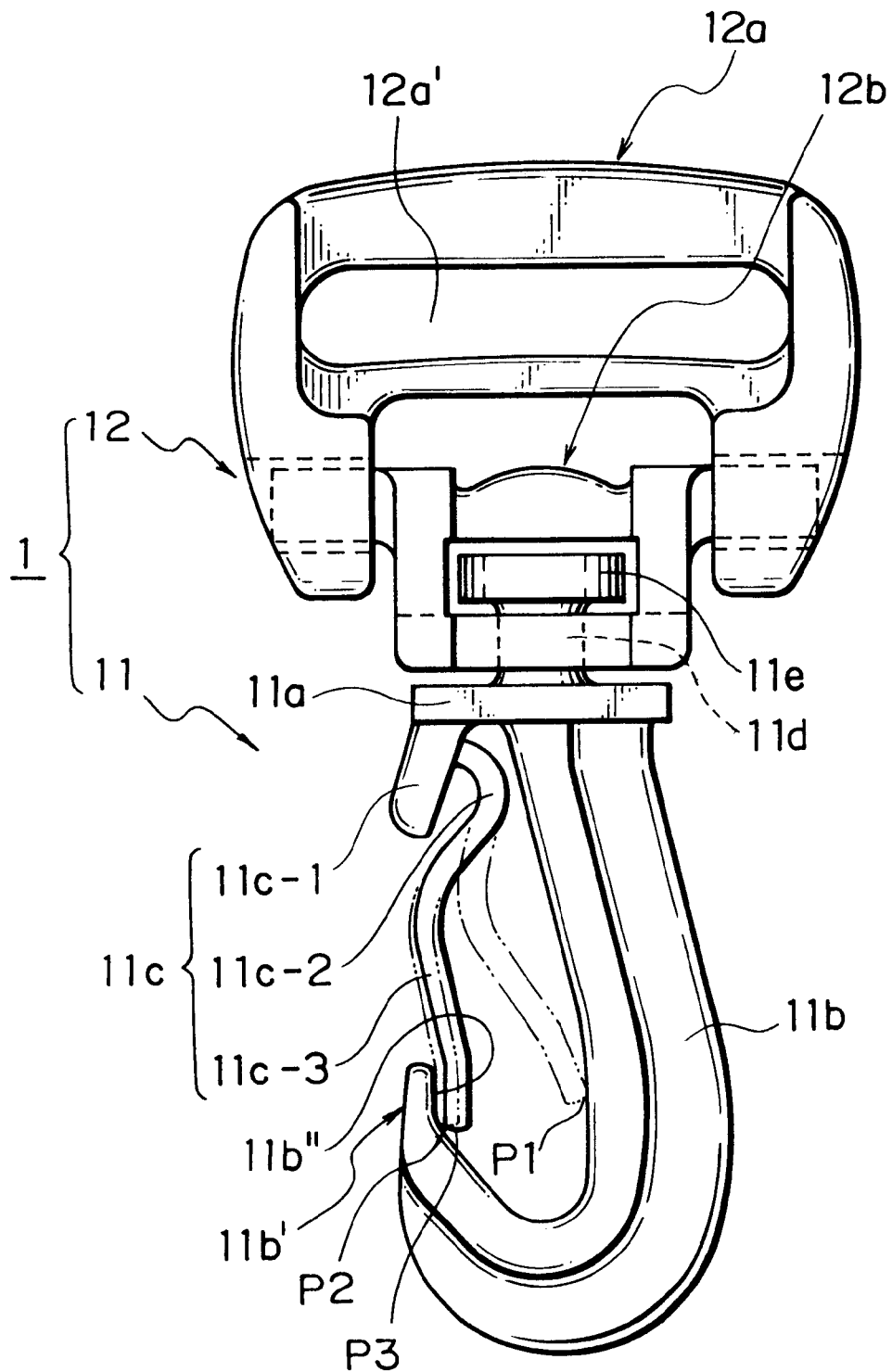
FIG. 1 is a front view of a swivel hook according to a typical embodiment of the present invention.
Figure 2:
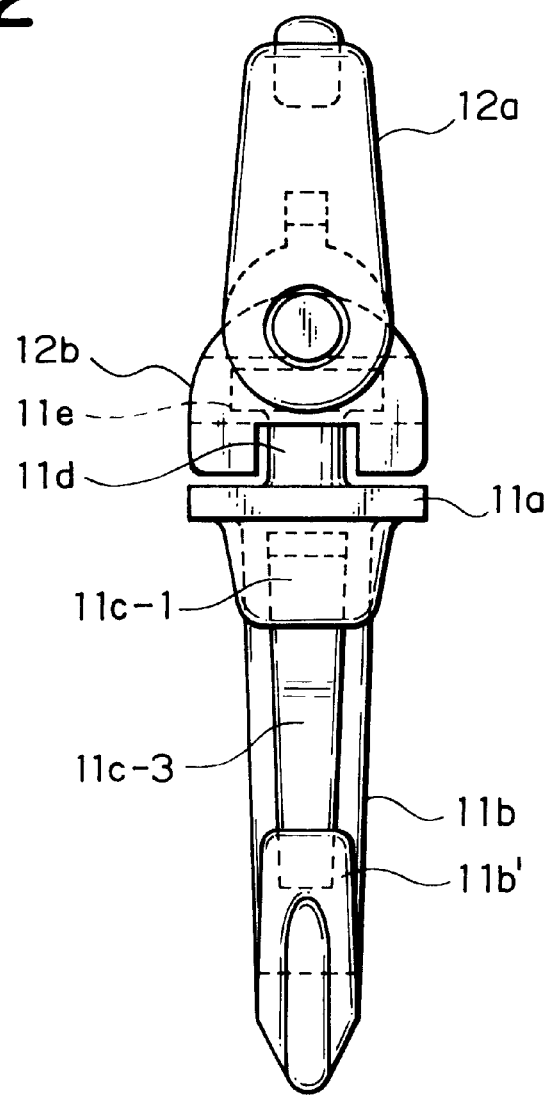
FIG. 2 is a side view of the swivel hook of FIG. 1.
Figure 3:
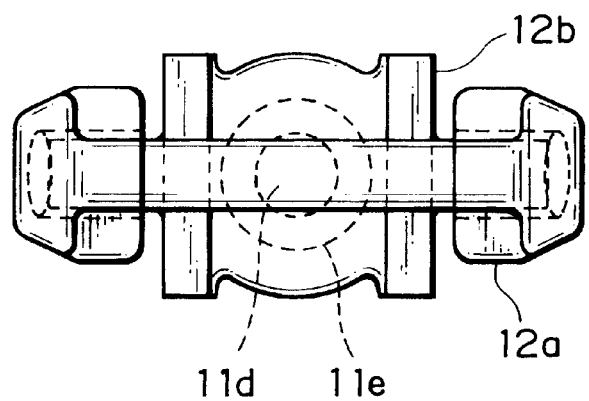
FIG. 3 is a top view of the swivel hook of FIG. 1.

FIGS. 1–3 show a first embodiment of the present invention. FIG. 1 is a front view of the swivel hook 1, FIG. 2 is a side view thereof and FIG. 3 is a top view thereof. Referring to these Figures, a swivel hook main body 11 comprises a disk shaped base portion 11a, a hook body 11b protruded in a hook shape from a surface of the base portion 11a and a stopper piece 11c protruded from the same surface of the base portion 11a and opposing an inner face of a base end of the hook body 11b toward a front end of the hook body 11b and further, includes a small disk shaped engaging portion 11e protruded from the other surface of the base portion 11a through a narrow diameter neck portion 11d.

On the other hand, a belt connecting ring 12 which the aforementioned engaging portion 11e engages comprises a substantially C letter shaped belt connecting portion 12a having a belt insertion hole 12a' and an engaged portion 12b which is supported freely rotatably by right and left end portions of the belt connecting portion 12a and with which the engaging portion 11e of the swivel hook main body 11 engages. According to this embodiment, the aforementioned swivel hook main body 11 and belt connecting ring 12 are molded simultaneously in a condition that the engaging portion 11e engages the engaged portion 12b. This molding method is substantially the same as the one disclosed in U.S. Pat. No. 5,566,428 and therefore, a description thereof in detail is omitted.

Although the structure of the hook body 11b is not different from a conventional structure, the stopper piece 11c has a characteristic structure of the present invention. As understood from FIG. 1, the stopper piece 11c comprises a base end portion 11c-1 formed of a substantially inverted trapezoid shape plate member protruded obliquely linearly from the base portion 11a of the swivel hook main body 11 and having predetermined stiffness and thickness, a curved portion 11c-2 which is protruded toward an inner face of the base end of the hook body 11b from an intermediate portion near the base end of the base end portion 11c-1 and which is curved in substantially U-shaped such that a space between the curved portion and a front end of the base end portion 11c-1 is open outward, and a tongue piece portion 11c-3 of a narrow plate member which is extended in a curved shape from an end of the curved portion 11c-2 such that it contacts an inside fitting face 11b″ of an curved end portion 11b′ of the aforementioned hook body 11b.

The base end portion 11c-1 is not related directly to elastic deformation but so constructed that even if some extent of a strong outside force is applied, its base portion is not broken, namely, it is constructed with a skirt portion, for example. On the other hand, although the aforementioned belt connecting ring 12 is different from the conventional one in terms of design, a structure and operational effect thereof are not different from that. Therefore, a description of the belt connecting ring 12 is omitted, and the operational effect of the swivel hook main body 11 will be described.

According to the first embodiment, if an ordinary outside force is applied to the tongue piece portion 11c-3 of the stopper piece 11c, that force is used almost for elastic deformation of the curved portion 11c-2. As indicated by a phantom line of FIG. 1, the front end of the tongue piece portion 11c-3 comes into contact with the inner face of the hook body 11b at a point P1 smoothly. Then, if the outside force is released, the aforementioned curved portion 11c-2 is returned to its original shape and with the restoration action, the tongue piece portion 11c-3 is returned to an original position P2 so that the tongue piece portion 11c-3 comes into contact with a front end fitting face of the hook body 11b.

When an unexpected outside force is applied to the swivel hook and the stopper piece is broken, in most cases, it is broken by an outside force directly applied to the base end portion of the stopper piece. However, even if a strong outside force is applied to the base end portion 11c-1 of the stopper piece 11c of this embodiment, it is not deformed elastically and further, because a strength of the base end portion 11c-1 is higher than the other portions, it is hardly broken. Further, the base end portion 11c-1 functions as a block for the curved portion 11c-2 so that breakings of the curved portion 11c-2 and tongue piece portion 11c-3 are prevented.

The aforementioned structure of the stopper piece 11c of this embodiment ensures an effective production of the swivel hook 1. Generally, when a molded product is taken out from a cavity of a molding die at the time of molding, it is contracted. Particularly, in a C-shaped or U-shaped molded product, its opening side end portion is contracted in a direction so that both ends approach each other because a temperature distribution of the molded product is different at the time of molding. For example, if a cavity of the molding die is designed that a front end of the stopper piece 11c is located at a position P3 indicated by a solid line of FIG. 1, the front end of a molded product is deformed to the position P2 indicated by a phantom line of FIG. 1.

The present invention uses this contraction upon molding. If the cavity of a molding die (not shown) is designed such that the front end position of the stopper piece 11c is located at the position P3, slightly off inward from the inside fitting face 11b″ of the hook body 11b, a molded product is contracted so that an opening portion of the curved portion 11c-2 is narrowed. Then, a front end outside face of the tongue piece portion 11c-3 is moved toward the inside fitting face 11b″ of the hook body 11b, so that it comes into contact with the inside fitting face 11b″ or approaches to such an extent that the function of the swivel hook 1 is not lost.

Therefore, according to this embodiment, a process in which the product is molded such that the front end of the stopper piece 11c is located outside opposite to the inside fitting face 11b″ of the hook body 11b and after the molding, by deforming the stopper piece 11c elastically, it is moved to inside of the hook body 11b so that the front end of the stopper piece 11c is brought into contact with the inside fitting face 11b″ of the hook body 11b by restoration force, becomes unnecessary, thereby leading to improvement of productivity and reduction of production cost.

Figure 4:
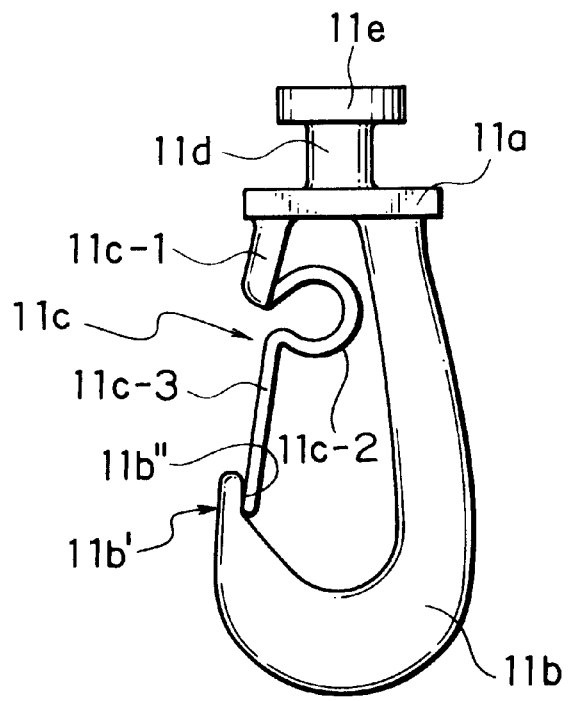
FIG. 4 is a front view of the swivel hook main body according to a second embodiment of the present invention.

FIG. 4 is a front view of the swivel hook main body 11 according to a second embodiment of the present invention. Referring to the same Figure, the aforementioned stopper piece 11c has a characteristic structure. The stopper piece 11c comprises a base end portion 11c-1 protruded from the base portion 11a and having the same shape as the first embodiment, a curved portion 11c-2 which is projected toward inside of the hook body 11b substantially at right angle from a tip end of the base end portion 11c-1 and curved in a substantially C-shape opening outward, and a tongue piece portion 11c-3 extending linearly toward the inside fitting face 11b″ of the hook body 11b substantially at right angle from a tip end of the curved portion 11c-2. This embodiment exerts the same operational effect as the first embodiment. However, when an ordinary outside force is applied to the stopper piece 11c, the elastic deformation of the curved portion 11c-2 is larger than the first embodiment and easily made.

Figure 5:
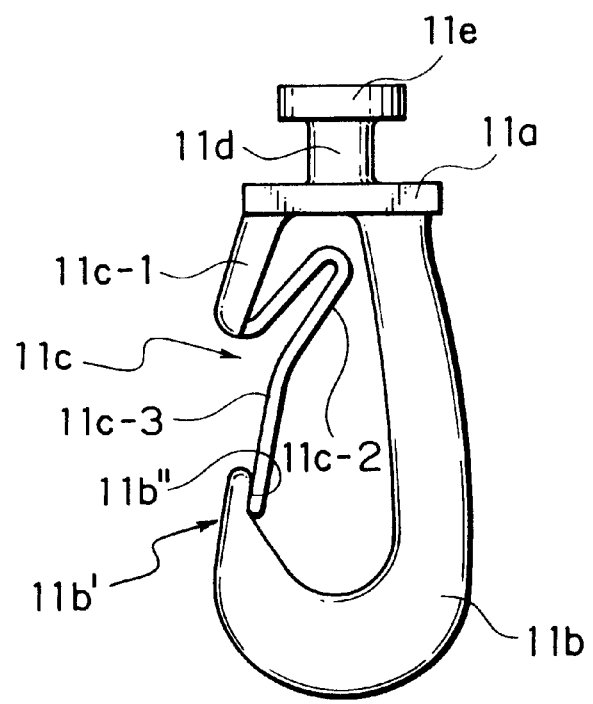
FIG. 5 is a front view of the swivel hook main body according to a third embodiment of the present invention.

FIG. 5 is a front view of the swivel hook main body 11 of a third embodiment of the present invention. Referring to the same Figure, the stopper piece 11c has a characteristic structure. The stopper piece 11c comprises a base end portion 11c-1 protruded from the base portion 11a and having the same shape as the first embodiment, a curved portion 11c-2 which is projected obliquely toward the base portion 11a and an inner face of the hook body 11b from a tip end of the base end portion 11c-1 and curved and inverted in a substantially U-shape at a position in which it approaches the base portion 11a and a tongue piece portion 11c-3 which is extended linearly from a tip end of the curved portion 11c-2 toward the inside fitting face 11b″ of the hook body 11b. This embodiment also exerts the same operational effect as the second embodiment.

Figure 6:
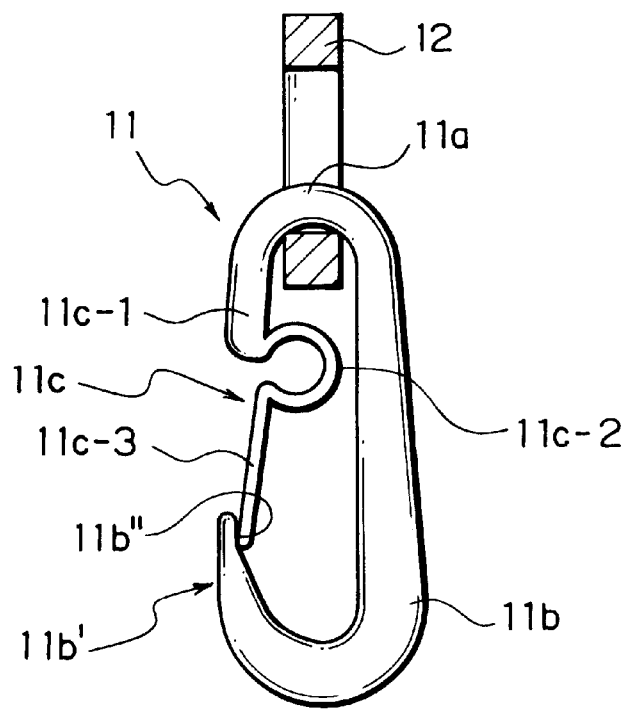
FIG. 6 is a front view of the swivel hook main body according to a fourth embodiment of the present invention.
Figure 7:
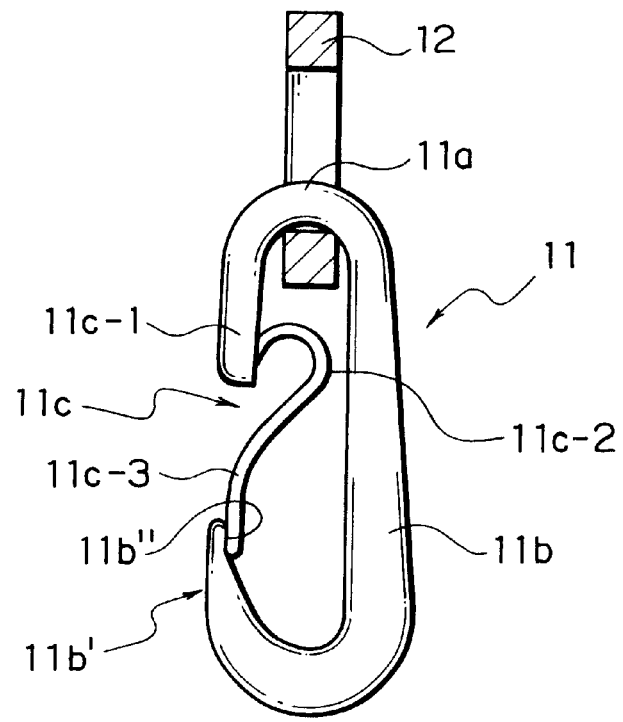
FIG. 7 is a front view of the swivel hook main body according to a fifth embodiment of the present invention.

FIGS. 6 and 7 show fourth and fifth embodiments corresponding to the aforementioned second and third embodiments shown in FIGS. 4 and 5. In the swivel hook 1 of these embodiments, the swivel hook main body 11 is formed integrally such that the hook body 11b is continuous with the base end portion 11c-1 of the stopper piece 11c through the U-shape curved thick base portion 11a. The base portion 11a is supported freely swingably as it is inserted through the belt connecting ring 12.

According to the fourth embodiment shown in FIG. 6, the stopper piece 11c comprises the base end portion 11c-1 protruded substantially parallel to the hook body 11b from an end of the base portion 11a, a curved portion 11c-2 which is protruded substantially at right angle from an end of the base end portion 11c-1 toward an inner face of the hook face 11b and curved substantially in C-shape such that it is open outward and a tongue piece portion 11c-3 linearly extending substantially at right angle from an end of the curved portion 11c-2 toward the inside fitting face 11b″ of the hook body 11b.

According to the fifth embodiment shown in FIG. 7, the stopper piece 11c comprises a base end portion 11c-1 protruded substantially parallel to the hook body 11b from an end of the base portion 11a, a curved portion 11c-2 which is protruded obliquely from an end of the base end portion 11c-1 toward inner faces of the base portion 11a and the hook body 11b and curved and inverted substantially in U-shape near the base portion 11a and a tongue piece portion 11c-3 extending in a curved shape from an end of the curved portion 11c-2 toward the inside fitting face 11b″ of the hook body 11b.

Figure 8:
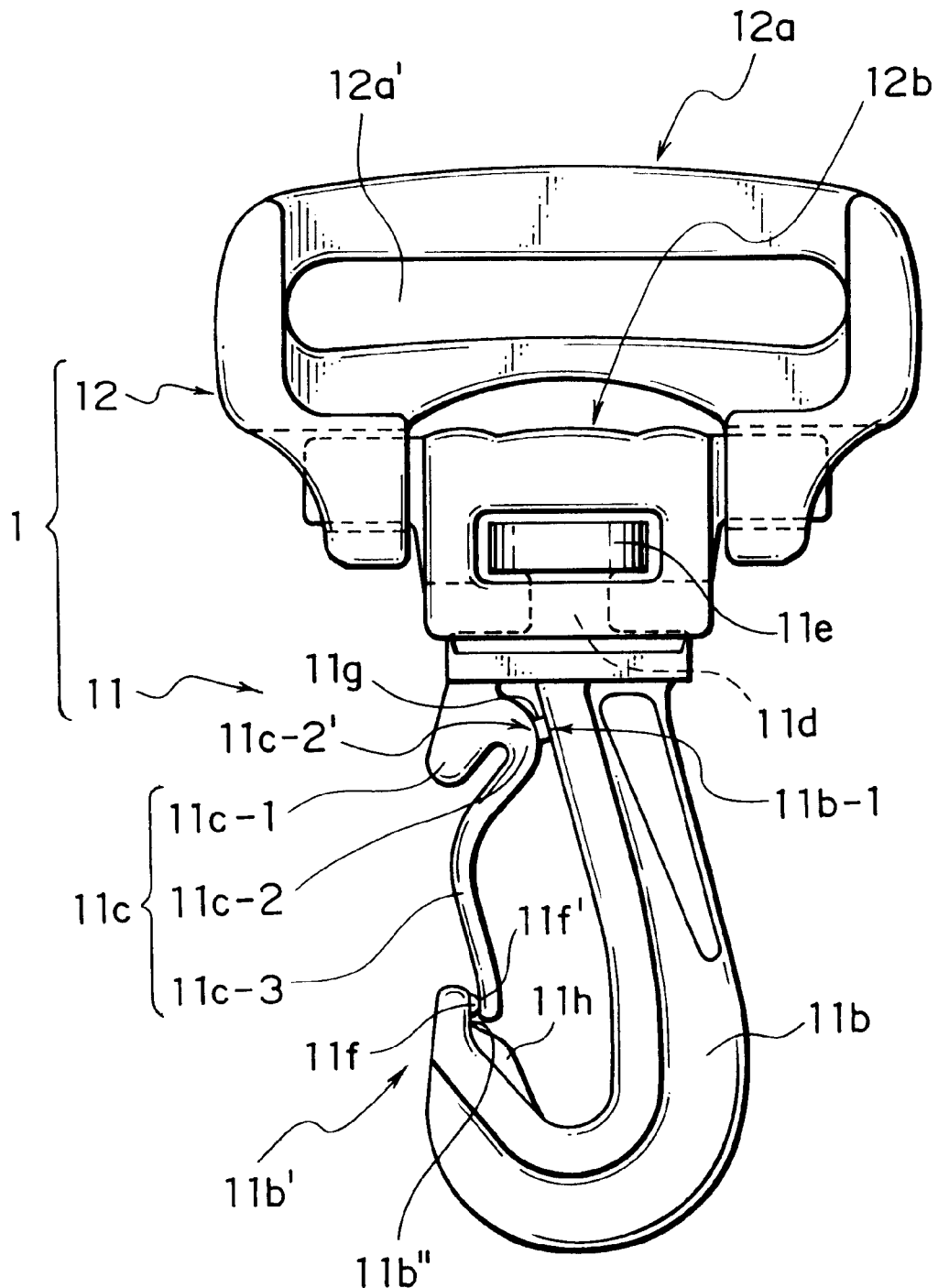
FIG. 8 is a front view of the swivel hook main body according to a sixth embodiment of the present invention.
Figure 9:
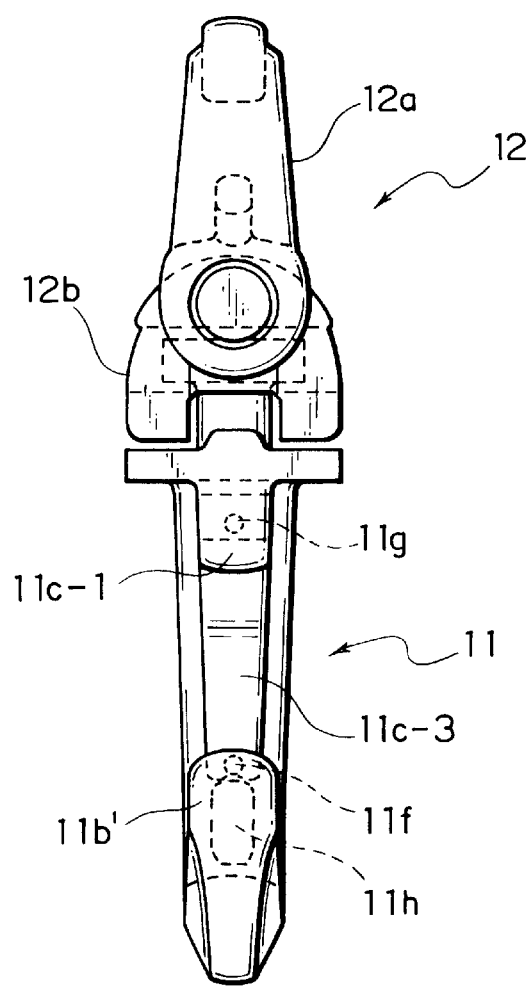
FIG. 9 is a side view from a tongue piece portion side of the swivel hook main body.
Figure 10:
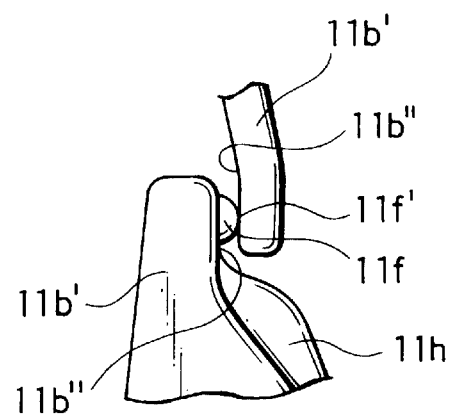
FIG. 10 is a fragmentary front view of an engaging portion between a hook body of the swivel hook main body and the tongue piece portion, in an enlarged scale.

FIG. 8 to FIG. 10 show a sixth embodiment of the invention.

In this embodiment, there are three differences from the above described embodiments. The first difference is that a projection 11f is formed to project from the inside fitting face 11b″ of the hook body 11b and a thin portion 11f′ is connected with the end of the stopper piece 11c by integral molding. The second difference is that the curved portion 11c-2 and the hook body 11b are connected via a small connecting piece 11g. The third difference is that a projecting rib 11h is provided on the inner face of the curved end portion 11b′ of the hook body 11b, adjacent to the projection 11f. The rib 11h has a height the same as that of an extension line of an inner face of the end of the tongue piece portion 11c-3. The height of the rib 11h gradually decreases at its both ends in a direction of curving of the curved end portion 11b′ so as to continue with the inner face of the hook body 11b.

In this embodiment, an amount of deformation due to the contraction of the curved portion 11c-2 of the stopper piece 11c at the time of molding is small. As a result, a gap which 11c at the time of molding is small. As a result, a gap which deteriorates the function of the swivel hook may be formed between the end of the tongue piece portion 11c-3 and the inside fitting face 11b″ at the end of hook body 11b. In this respect, the projection 11f projecting toward a front end outer face of the tongue piece portion 11c-3 is provided on the inside fitting face 11b″ of the hook body 11b. Therefore, an end portion of the tongue piece portion 11c-3 can be securely contacted with the projecting end of the projection 11f, after contraction in the molding.

However, even if the above described structure is adopted, provided that the molding is performed in a non-illustrated mold with a cavity for molding the projection 11f being not communicated with a cavity for molding the tongue piece portion 11c-3 of the stopper piece 11c, the projecting end of the projection 11f scarcely contacts with the outer face of the tongue piece portion 11c-3. As a result, the function of the swivel hook may be lost.

Consequently, in this embodiment, a thin portion 11f′ at the end of the projection 11f is molded to be connected integrally to the front end outer face 11c-3′ of the tongue piece portion 11c-3. In other words, in the non-illustrated mold, the cavity for molding the projection 11f is formed to communicate with the cavity for molding the tongue piece portion 11c-3 of the stopper piece 11c. A channel between the non-illustrated cavity for molding the projection 11f and the non-illustrated cavity for molding the tongue piece portion 11c-3 is narrower than a gate of normal cases.

With this arrangement, the tip end of the projection 11f and the front end outer face 11c-3′ is connected via the thin portion 11f′. And due to the contraction in molding, the front end outer face 11c-3′ of the tongue piece portion 11c-3 becomes closer to the tip end of the projection 11f. Because the connection is realized by the thin portion 11f′, the thin portion 11f′ can be easily broken by a hooking operation for hooking a non-illustrated companion connecting ring on the hook body 11b of the swivel hook 1 for the first time after molding. In this case also, the front end outer face 11c-3′ of the tongue piece portion 11c-3 securely contacts with the tip end of the projection 11f or there is the gap small enough to maintain the function of the swivel hook.

On the other hand, provision of such a projection 11f may cause possibility that, even if the gap between the inside fitting face 11b″ of the hook body 11b and the front end outer face 11c-3′ of the tongue piece portion 11c-3 is opened wide enough to allow the connecting ring to pass so as to unhook the non-illustrated companion connecting ring which is hooked on a hook portion of the hook body 11b from the swivel hook 1, the projection 11f may hinder the easy unhooking. The above described third difference is presented for solving this problem.

Specifically, if the rib 11h having the aforementioned structure is provided on the inner face of the curved end portion 11b′ of the hook body 11b adjacent to the projection 11f, at the time of unhooking the non-illustrated companion connecting ring from the swivel hook 1 of this embodiment, the connecting ring is guided by the rib 11h to the height of the projection 11f so that the connecting ring can be unhooked from the swivel hook 1 easily. In case that the material cost can be ignored, the projection 11f and the rib 11h may be molded integrally.

As described above, the curved portion 11c-2 of the stopper piece 11c is liable to deform to be away from the inner face of the hook body 11b due to the contraction in molding. Therefore, when a strong outside force is exerted on the stopper piece 11c, the tongue piece portion 11c-3 together with the curved portion 11c-2 may get broken at a portion of connection with the base end portion 11c-1.

Therefore, as described above, the area 11c-2′ of the curved portion 11c-2 of the stopper piece 11c, which is the nearest to the hook body 11b and the inner face area 11b-1 of the hook body 11b are connected via the small connecting piece 11g, the curved portion 11c-2 does not deform to be away from the inner face of the hook body 11b due to the contraction in molding. And even if a strong outside force is exerted on the stopper piece 11c, the tongue piece portion 11c-3 is easy to elastically deform originally, the stopper piece 11c is easily deformed at the connecting piece 11g so that problems such as breakage can be prevented.

However, if the connecting piece 11g has the same width as that of the tongue piece portion 11c-3, an amount of contraction in molding based on the curved portion 11c-2 decreases. Therefore, it is desirable that the size of the connecting piece 11g is made to be as small as possible. At the same time, the connecting piece 11g should be rigid enough not to get damaged easily by the outside force. Consequently, the connecting piece 11g should have such a size that it can not be influenced by the aforementioned contraction and can have adequate rigidity. The size is determined properly depending on its usage.

As apparent from the above description, the swivel hook of the present invention may be modified in various ways and is not restricted to the above described embodiments.

What is claimed is:

1. A synthetic resin swivel hook having a hook body extending in a shape of a hook from a base portion and a stopper piece extending up to a curved end portion of said hook body and elastically deformable around a base end thereof, wherein said stopper piece comprises a base end portion protruded from said base portion in the same direction as said hook body; a curved portion formed to be integral with said base end portion and forming substantially C-shape or U-shape protruding toward an inner face of said hook body and being open outward between said base end portion and said hook body; and a tongue piece portion extending from said curved portion up to an inside fitting face of the curved end portion of said hook body.

2. A synthetic resin swivel hook according to claim 1, wherein a projection is provided on said inside fitting face of the hook body, said projection projecting toward said tongue piece portion.

3. A synthetic resin swivel hook according to claim 2, wherein a thin portion at a tip end of said projection is formed to be integral with a front end outer face of said tongue piece portion.

4. A synthetic resin swivel hook according to claim 1, wherein a connecting piece is provided to connect an area in said curved portion of said stopper piece which is nearest to said inner face of said hook body with an inner face area of said hook body confronting said area integrally.

5. A synthetic resin swivel hook according to claim 1 or 2, wherein the curved portion is curved toward an inner face of the hook body from halfway of the base end portion and protruded toward an inner face of the hook body.

6. A synthetic resin swivel hook according to claim 1, wherein the curved portion is curved continuously from an end of the base end portion toward an inner face of the hook body and protruded toward the inner face of the hook body.

7. A synthetic resin swivel hook according to claim 1, wherein the curved portion is curved continuously from an end of the base end portion toward the base portion so as to protrude toward an inner face of the hook body.

8. A synthetic resin swivel hook according to claim 1, wherein the tongue piece portion is composed of a narrow plate member extending linearly up to an inside fitting face of the hook body.

9. A synthetic resin swivel hook according to claim 1, wherein the tongue piece portion is composed of a narrow plate member which is curved inward of the hook body and extended in a curved shape up to an inside fitting face of the hook body.

* * * * *